(12) United States Patent
Petersen et al.

(10) Patent No.: US 7,119,684 B2
(45) Date of Patent: Oct. 10, 2006

(54) ELECTRONIC TAMPERING DETECTION SYSTEM

(75) Inventors: Michael Petersen, Ottawa (CA); Allan Wilson, Ottawa (CA)

(73) Assignee: Intelligent Devices, Inc., Barbados (KN)

( * ) Notice: Subject to any disclaimer, the term of this patent is extended or adjusted under 35 U.S.C. 154(b) by 0 days.

(21) Appl. No.: 11/113,323

(22) Filed: Apr. 25, 2005

(65) Prior Publication Data

US 2005/0225445 A1     Oct. 13, 2005

Related U.S. Application Data

(63) Continuation of application No. PCT/CA2003/001625, filed on Oct. 24, 2003.

(30) Foreign Application Priority Data

Oct. 25, 2002   (CA) .................................. 2409624

(51) Int. Cl.
*G08B 13/14* (2006.01)

(52) U.S. Cl. ................ 340/568.1; 340/571; 340/572.1; 340/572.8

(58) Field of Classification Search ............. 340/568.1, 340/571, 572.1, 572.8; 383/5; 257/793; 156/226; 235/492
See application file for complete search history.

(56) References Cited

U.S. PATENT DOCUMENTS 4,818,120 A * 4/1989 Addiego ..................... 383/5
5,323,150 A * 6/1994 Tuttle ........................ 257/793
6,375,780 B1 * 4/2002 Tuttle et al. ................ 156/226
2004/0104274 A1 * 6/2004 Kotik et al. ................ 235/492

FOREIGN PATENT DOCUMENTS

| EP | 329960 A2 | 8/1989 |
| GB | 2287339 A | 9/1995 |
| WO | WO 02/38456 A1 | 5/2002 |

* cited by examiner

*Primary Examiner*—Jeffery Hofsass
*Assistant Examiner*—Samuel J. Walk
(74) *Attorney, Agent, or Firm*—Jones,Tullar&Cooper, P.C.

(57) ABSTRACT

An electronic tampering detection system is applied to a blank which can be formed into a package through the use of closure tabs which are coated with an electrically conductive adhesive. An electronic chip or CPU is applied to the blank and electrically conductive traces are printed or otherwise formed on the blank to connect the CPU to a first pair of the closure tabs to form an electric circuit. Other traces on the blank connect the first pair of closure tabs to the other closure tabs to form an enlarged circuit. The CPU has procedure memory, data memory, a power source, a clock and communication means associated therewith. If a package is opened accidentally or intentionally before it should be opened by way of the closure tabs the electric circuit is broken and a time stamp from the CPU clock is stored in the data memory for later retrieval. The circuit can be formed as resistances in parallel and an analog to digital converter can be used to provide an appropriate signal to the CPU. The electric circuit can cover a large portion of the blank's surface to provide a signal in the event of unauthorized penetration of the formed package.

23 Claims, 5 Drawing Sheets

ELECTRONIC TAMPERING DETECTION SYSTEM

This application is a continuation of, and claims the benefit of, International Application No. PCT/CA2003/001625, filed 24 Oct. 2003 and entitled "Electronic Tampering Detection System", published in English on 6 May 2004 under Publication No. WO 2004/037660 A1, the disclosure of which is hereby incorporated herein by reference. This application also claims the benefit of Canada Serial No. 2,409,624, filed 25 Oct. 2002.

This invention relates to a system for detecting tampering with paper board (cardboard) packages and containers.

BACKGROUND OF THE INVENTION

Folded paper board (cardboard) packages (boxes, containers) are widely used to organize and ship a variety of contents. Many such contents are at risk for tampering or theft. In such scenarios, the paper board package is opened by an unauthorized person, giving unauthorized access to the contents of the package. The contents may be stolen and replaced with inactive versions of the contents, part or all of the units may simply be removed from the package (stolen), or the contents may be contaminated by the addition of toxic substances to the contents. The unauthorized person might then reseal the package, allowing it to continue in the distribution chain, disseminating its altered contents.

It is widely acknowledged that it would be useful to have a means of detecting unauthorized access to the contents of cardboard packages to protect against theft and alteration of the contents thereof. Although there are many areas in which such a device might prove useful, there has recently been expressed particular concern by the FDA about the possibility of tampering with pharmaceuticals, pharmaceutical components, and food products.

SUMMARY OF THE INVENTION

The invention uses a system or systems of electrically conducting traces or coatings and/or electrically conducting glue connected to a central processing unit (CPU) in such a way that opening or penetrating the cardboard package will cause a change in the electrical characteristics of the circuit so created. The CPU monitors the circuit for such changes, and generates data about the time and other characteristics of the event, storing the data in its data memory. The data can later be accessed by an interested party, who can then determine if, and at what point in the supply chain, tampering occurred.

Two general tamper detection methods are described:

The first method uses one or a plurality of individual circuits each connected directly to the CPU. The CPU monitors the continuity of the circuit(s). Breaking the circuit triggers a time stamp by the CPU according to its clock and the data is stored in the CPU's data memory to be retrieved later by an interested party. Because this method is based on one of two possible states (circuit open and circuit closed) it can be described as a "digital" method.

The second method uses one or a plurality of sensor circuits arranged as resistances in parallel in a primary circuit, the electrical characteristics of which are monitored by the CPU via an analog-to-digital converter (ADC). Interrupting the continuity of the sensor circuits results in changes in the electrical characteristics of the primary circuit. Changes are compared to fixed (or dynamic) change criteria stored (or calculated) in the CPU's procedure memory and those changes meeting the criteria are interpreted as tampering and/or penetration events. The criteria for a significant change may be fixed at the time of programming the CPU, or they could be dynamic, where the procedure memory of the CPU updates the change criteria on the basis of its most recent determinations. The use of dynamic criteria compensates for drifting of the electrical characteristics of the circuit such as those due to changes in temperature and humidity, which changes do not vary linearly as a function of the number of events previously detected. The use of dynamic criteria maximizes the discriminability of the changes in resistance occasioned by breaking the sensor circuits, permitting more such sensor circuits to be monitored by a single circuit of given voltage. The time and other characteristics of interest are then stored in the CPU's data memory for later retrieval by an interested party. Because this method is based on a number of values or steps in the electrical characteristics of a circuit it can be described as an "analog" method.

Variations in design of the circuits are also described.

The CPU comprises an internal or external clock, internal or external ADC where required for analog monitoring, a power source and an antenna. It has both procedure and data memories, the latter of which may be volatile or non-volatile and internal or external to the CPU depending on the desired use. The CPU has the ability to communicate with external devices via radio frequency (RF), infrared (IR) or direct contact, as desired. The data can thus be retrieved for storage or analysis at a later time by a party interested in the integrity of the package, and in the case of a tampered package, the point in the chain where the tampering occurred. The later can be determined from the time stamped data and other information about the event.

The invention comprises a CPU communicating with a system of electrically conducting traces printed or otherwise attached to the paper board comprising the package. The points of closure are attached by means of electrically conducting adhesive in such a way that they form part of the circuit(s). The CPU monitors the circuit(s) for changes in electrical characteristics. Fixed (or dynamic) criteria for changes considered to represent opening or penetration of the package (tampering) are stored (or calculated) in the CPU's procedure memory. When the package is opened or penetrated, the circuit is broken. The resulting change in electrical characteristics is noted by the CPU. If the change meets the criteria, the time of the event, as determined by the CPU's clock, is stored in the CPU'S data memory. Other data of interest, such as information about changes in light intensity, humidity, temperature, vibration, shock, or radiation, may also be captured by suitable environmental sensors and stored. Such variables may also be used to detect tampering in specific applications.

In one version of the invention (digital method), the tabs dosing the package by electrically conducting glue are arranged as a single closed electrical circuit terminating on the input pins of a CPU. Opening the package via one of its tabs opens the circuit. The CPU monitors the circuit for continuity (digital method), determines the time when the continuity is broken from its clock, and records the time in its data memory.

In a variation of the digital version of the invention, subsets of the tabs are connected as independent circuits to different input pins of the CPU and a common ground. Each circuit requires one input pin connection and a common connection. In this variation, several points of opening can be monitored independently, and data can be obtained regarding multiple opening events where this is of interest.

In a further variation of the digital version of the invention, the tabs closing the package by electrically-conducting glue are connected by patterns of electrically conducting traces to form a single electrical circuit, the continuity of which is monitored by the CPU. A break in continuity is considered to represent a tampering event (opening or penetration) and the time is determined from the CPU's clock and recorded in its data memory. The conductive traces can be arranged in any pattern or randomly to cover all surfaces of the package according to the requirements of the application.

In a further variation of the digital version of the invention combinations of glued tabs and electrically conducting traces can be arranged to form separate electrically conducting circuits that can be monitored independently for continuity by the CPU. In this version multiple tampering events can be time stamped and the location of the tampering determined.

In a second version (analog method) of the invention, one or more sensor circuits connecting the closing tabs by electrically conducting traces printed on the surface of the package are arranged as resistances in parallel between two input pins of the CPU. The CPU via the ADC monitors the electrical characteristics of the parallel circuit, and interprets opening events according to fixed (or dynamic) change criteria stored (or calculated) in the CPU's procedure memory. When changes in resistance or other electrical characteristics of the circuit meet the criteria, the time of the event is determined from the CPU's clock and recorded in the data memory. This method is limited to detecting package opening via the closing tabs.

In some situations it may be desirable to monitor the package for both opening and penetration tampering. In a variation of the analog version of the invention, one or more sensor circuits comprising closing tabs, electrically conducting traces printed on the surface of the package, or combinations of tabs and traces are arranged as resistances in parallel between two input pins of the CPU. The CPU via the ADC monitors the electrical characteristics of the parallel circuit, and interprets opening or penetration events according to fixed (or dynamic) change criteria stored (or calculated) in the procedure memory of the CPU. When changes in resistance or other electrical characteristics of the circuit meet the criteria, the time of the event is determined from the CPU's clock, and recorded in the CPU's data memory. The data can later be retrieved by an interested party, who can determine if tampering has occurred, whether such tampering involved opening or penetrating the package, and when it occurred.

In a further variation of the analog version of the invention, the entire surface of the package is covered by a grid or other pattern of conducting traces. The ADC of the CPU is attached to this conducting grid at two disparate points, creating a circuit. The CPU monitors the electrical characteristics of the surface (circuit) for fixed (or dynamic) change criteria stored (or calculated) in the procedure memory. A change meeting the criteria is interpreted as a tampering event, the time of which is determined from the CPU's dock, and recorded in the data memory.

In a further variation of the analog grid version described above, the grid is replaced by a continuous coating of electrically conductive ink or other material covering the entire surface of the package. The ADC of the CPU is attached to this continuous coating at two disparate points, creating a circuit. The CPU monitors the electrical characteristics of the surface (circuit) for fixed (or dynamic) change criteria stored (or calculated) in the procedure memory. A change meeting the criteria is interpreted as a tampering event, the time of which is determined from the CPU's clock, and recorded in the data memory.

In a further variation of the above variations of the analog version of the invention using a continuous coating or grid of electrically conducting material, the coating or grid can be printed or otherwise applied continuously on the cardboard roll stock at time of its manufacture. At a later time, when the cardboard package is die or otherwise cut from the roll and assembled into a cardboard package, its continuous electrically conducting coating or grid is attached to the input pins of a CPU attached to the package. The ADC of the CPU monitors the electrical characteristics of the circuit (continuous coating or grid) for changes meeting fixed (or dynamic) change criteria stored (or calculated) in the CPU's procedure memory. Penetration of a surface of the package or opening of a tab causes a change in resistance, which change is detected by the CPU. Changes meeting the criteria are interpreted as tampering events and the time of the change is determined from the CPU's clock and stored in the data memory.

The use of a CPU with an ADC allows for the use of other environmental sensors in conjunction with the monitoring system described above. Sensors to measure changes in light, orientation, temperature, radiation, humidity and pressure can be used to supplement the tamper detecting ability of the present invention. For example, dark packages can be monitored by the ADC for increased light exposure; vacuum sealed packages can be monitored for changes in pressure; refrigerated packages can be monitored for changes in temperature as means of detecting tampering.

Generally speaking and in summary of the above, the present invention may be considered as providing a system for detecting tampering or unauthorized entry into a package formed from a blank having at least a pair of closure tabs, an inner surface and an outer surface, the system comprising: electrically conducting adhesive applied to each of the closure tabs; a programmable chip applied to one of the blank surfaces, the chip including a power source, procedure memory, data memory, clock means, and communication means; and electrically conducting trace means applied to one of the blank surfaces, one such trace means connecting the chip to the electrically conducting adhesive of one of the pair of closure tabs, and another of such trace means connecting the chip to the electrically conductive adhesive of the other of the pair of closure tabs; whereby with the blank having been formed into a closed package through adhesive joining together of the closure tabs, any separation of the tabs will break an electrical circuit which includes the trace means, the electrically conducting adhesive, and the chip means, which break will be recorded with a time stamp in the data memory of the chip.

In another aspect, the present invention may be considered to provide a system for detecting tampering or unauthorized entry into a package formed from a blank having at least a pair of closure tabs, an inner surface and an outer surface, the system comprising: electrically conducting adhesive applied to each of the closure tabs; a programmable chip applied to one of the blank surfaces, the chip including a power source, procedure memory, data memory, clock means, an analog to digital converter (ADC), and communication means; and at least two low resistance electrically conducting trace means applied to one of the blank surfaces and connected at one end thereof to the chip, and at least two high resistance electrically conductive trace means applied to the one blank surface, one of such high resistance trace means connecting one of the low resistance trace means to the electrically conducting adhesive of one of the pair of closure tabs, and another of such high resistance trace means connecting the other of the low resistance trace means to the electrically conducive adhesive of the other of the pair of closure tabs; whereby with the blank having been formed into a closed package through adhesive joining together of the closure tabs, any separation of the tabs will break an electrical circuit which includes the trace means, the electrically conducting adhesive, and the chip means, which break will be recorded as a change in system resistance with a time stamp in the data memory of the chip.

Other aspects and features of the present invention will be readily apparent to those skilled in the art from a review of the following detailed description of preferred embodiments in conjunction with the accompanying drawings.

BRIEF DESCRIPTION OF THE DRAWINGS

The invention will be further understood from the following description with reference to the drawings in which.

DETAILED DESCRIPTION OF THE PREFERRED EMBODIMENTS

Figure 1:
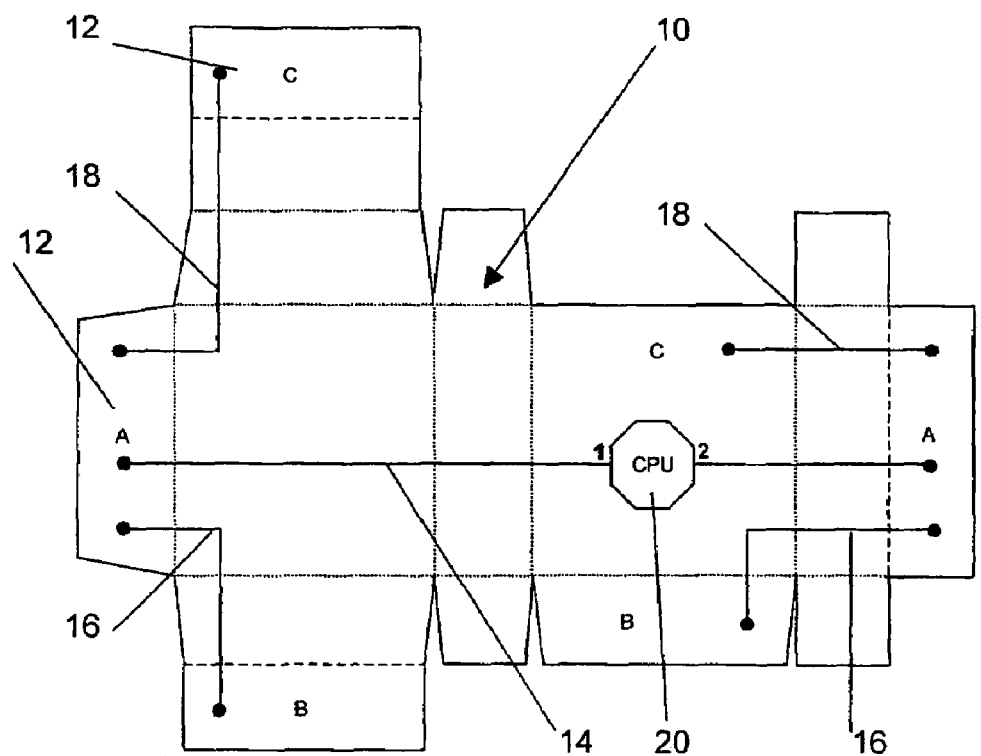
FIG. 1 depicts a package in which the three pairs of closing tabs are connected in series to a single monitoring circuit to detect opening of the package (digital method)

Referring to FIG. 1, a digital tampering detection device is described in accordance with an embodiment of the present invention, which device can be integrated in any paper board (cardboard) package during manufacturing. Typically, the package will be formed from a blank 10 provided with at least a pair of closure tabs which are adhesively secured together to close the blank, after folding into a closed package. In the embodiments shown the blank includes pairs of closure tabs A—A; B—B; and C—C which will co-act with each other to close the package. In the application depicted in FIG. 1, the device is arranged to detect unauthorized opening of a package (tampering) via the package's closing tabs.

The tamper detection system requires the closing tabs of the package (A—A, B—B and C—C in FIG. 1) to be coated with electrically conductive adhesive 12. A system of electrically conducting traces 14, 16, 18 of ink or other material is printed or otherwise applied to the surface of the blank to connect the closing tabs, forming an electrically conducting circuit. The circuit is connected to two input pins (1 and 2) of a central processing unit (CPU) 20, itself comprising a procedure memory, power source, data memory, clock, and communication means such as an antenna. The power source can be a conventional battery (such as a lithium or lithium ion cell), printed on the cardboard package, or otherwise manufactured, and the memory can be volatile or non-volatile according to the application.

In the embodiment of FIG. 1 the first traces 14 connect the CPU 20 to each of the first pair of closure tabs A—A; one of the second traces 16 and one of the third traces 18 connect one of the first closure tabs to respective ones of the second and third closure tabs B—B and C—C; and the other of the second traces 16 and the other of the third traces 18 connect the other of the first closure tabs A—A to the others of the second and third closure tabs B—B and C—C respectively. Preferably the traces 14, 16 18 will be applied to the blank so as to take the most direct route available between the connection points thereof. Of course, at each closure tab the respective traces will make electrical connection with the electrically conductive adhesive applied to the tab.

The CPU 20 monitors the continuity of the electrical circuit (digital method). If the continuity is broken by opening the formed package via one of its closing tabs, the time of the event is determined from the CPU's clock, the event is time stamped, and the time is recorded in the CPU's data memory. At a later time, an interested party can retrieve the data from the CPU's memory for analysis to determine if the package has been opened (tampered). In the event tampering has been detected, the interested party can extrapolate back along the supply chain to determine where the tampering occurred. The data can be retrieved via a reader at distance, as by radio frequency (RF) or infrared (IR) transmission, or by direct contact. In this application of the device, a single tampering event can be detected and the tampering must occur by the opening of one or more of the package's tabs.

Figure 2:
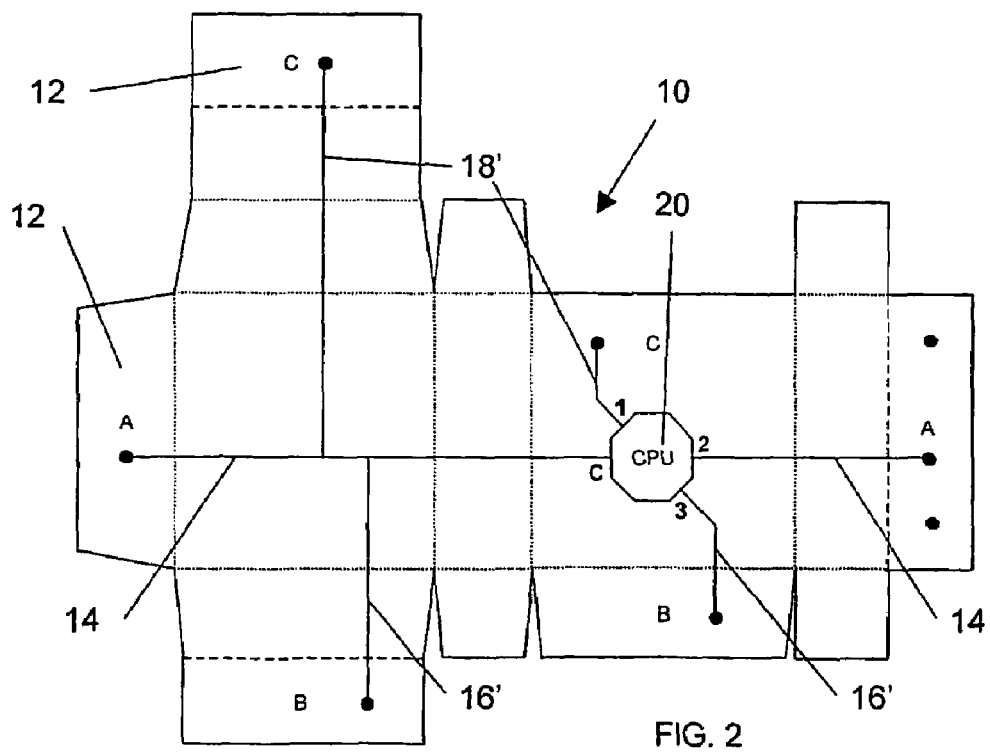
FIG. 2 depicts a package in which the three pairs of closing tabs are monitored individually to detect time and location of opening of the package (digital method)

In some applications it may be desirable to know which of a package's several closing tabs has been opened. FIG. 2 depicts an application of the tampering detection device that allows detection of multiple openings via the closing tabs. In this application of the device, each pair of closing tabs is connected to the CPU by As own electrically conducting trace. For a three tab-pair package, four connections to the CPU's input pins (1, 2, 3, and C) are required. Each circuit requires one connection to the CPU and the system requires a common (C) connection. In this configuration the CPU 20 is connected to the electrically conductive adhesive 12 of closure tabs A—A via the traces 14, 14; the CPU is connected to one each of the dosure tabs B—B and C—C via one each of the traces 16', 16' and 18', 18'; and the others of the closure tabs B—B and C—C are connected to one of the traces 14, 14 via the others of the traces 16', 16' and 18', 18'. The CPU monitors the circuits for continuity (digital method). Opening the package via a tab breaks the continuity in that circuit and the time is determined and recorded along with the tab's (circuit's) identity. This can occur once for each circuit. In some applications the procedure memory of the CPU may be programmed to reset the circuit if the tab is resealed with its conductive adhesive, re-establishing the circuit's continuity. In this application, multiple tab openings of the same tab can be detected and the times recorded. In other details the procedure is identical to that of the preceding detailed description in conjunction with FIG. 1. The advantage of this application is that details of specific tab openings and multiple such openings can be obtained where this is of interest. The disadvantage of this application is that the CPU requires more input pins and the system more attachments to the CPU, increasing manufacturing costs.

Figure 3:
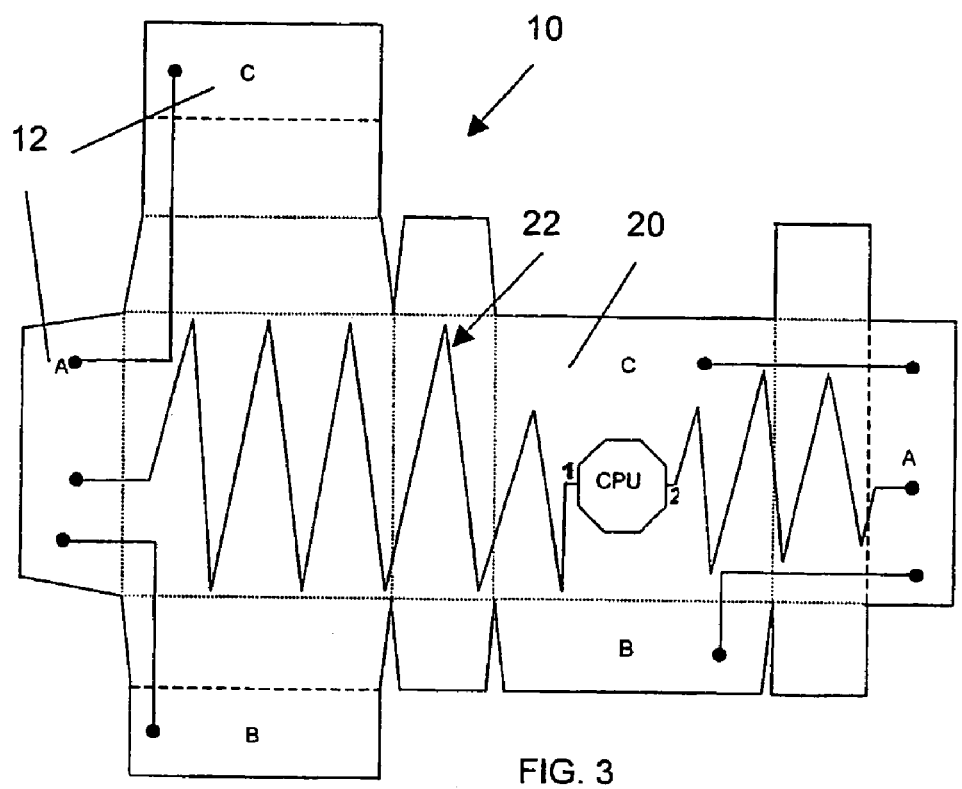
FIG. 3 depicts a package where the three pairs of opening tabs and a pattern of conductive traces are connected in series and monitored to detect opening or penetration of the package (digital method)

In other applications it may be desirable to detect package penetration through the sides of the package as well as opening via the closing tabs. In such applications a continuous pattern (including a random array) of electrically conducting traces can be used to connect the closing tabs of a package to form a single circuit. As depicted in FIG. 3, the circuit terminates on two input pins (1, 2) of the CPU 20 and the connecting traces 22 are arranged across the surface of the blank in a circuitous path that covers a large extent of the blank surface. The CPU 20 monitors the continuity of the circuit (digital method). Penetration of the package breaks one or more of the traces and opens the circuit as does opening the package via one of its closure tabs. The time of opening of the circuit is determined from the CPU's clock and stored in its data memory. The pattern of traces can be fine or coarse depending on the application. In other details the procedure is identical to that of the preceding detailed description in conjunction with FIG. 1. The advantage of this method is that both penetration and opening tamperings can be detected and that only two attachments to the CPU are required reducing the cost of production. The disadvantage is that only one tampering event can be detected and recorded, and that the design and application of the traces is more complicated.

Figure 4:
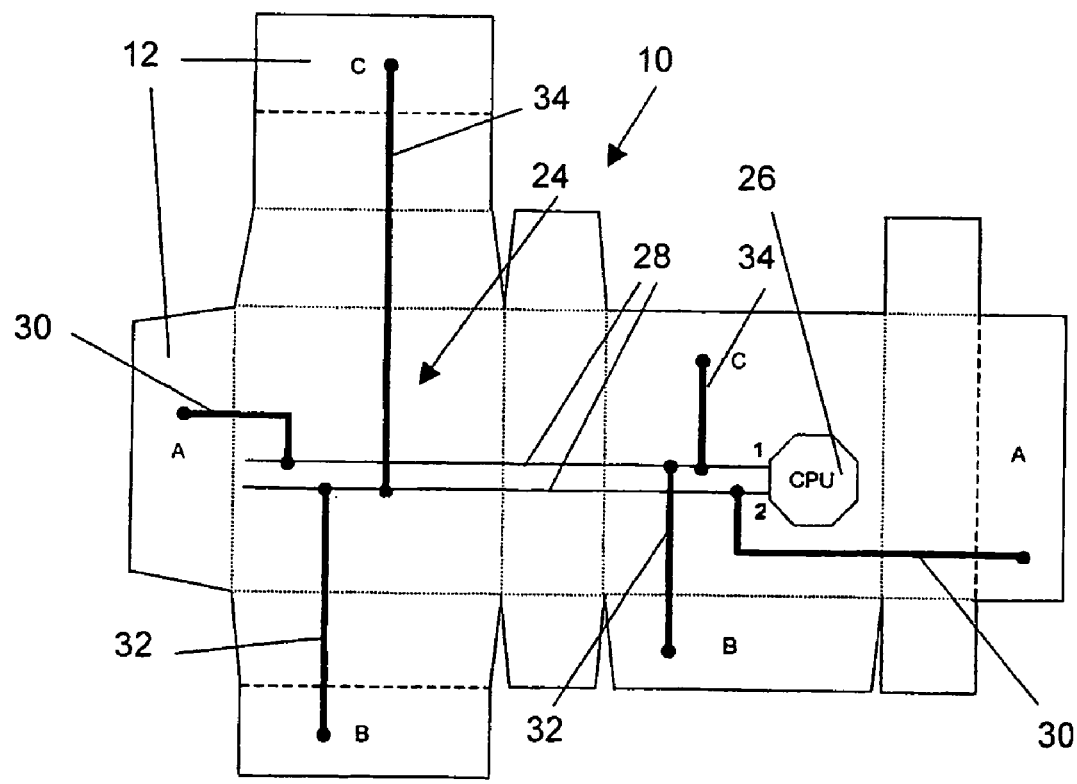
FIG. 4 depicts a package in which the three pairs of closing tabs, each with an associated pattern of conductive traces, are arranged as resistances in parallel to permit monitoring of a single circuit to detect three opening events (analog method)

The analog method lends itself to lower production costs due to the requirement for fewer connections to the CPU and the ability to utilize a simpler CPU with fewer input pins. It does require that the CPU have an analog-to-digital converter (ADC), which can be internal or external to the CPU. The analog method also allows for more flexibility in terms of the numbers and types of sensors that can be monitored simultaneously. FIG. 4 shows an analog opening monitoring system with three steps (sensor circuits). The pairs of closing tabs (A—A, B—B, C—C) are arranged as resistances in parallel in a single electrically conducting circuit 24 terminating on the input pins (1, 2) of a CPU 26. The ADC and CPU monitor the electrical characteristics of the circuit (resistance, voltage, current or combinations thereof) for fixed (or dynamic) change criteria stored (or calculated) in the CPU's procedure memory. A change meeting the criteria is interpreted as an opening event, the time is determined from the CPU's clock, and the information is stored in the CPU's data memory. The data can later be retrieved by a party interested in whether or not the package was opened (tampered). If tampering has been detected, the interested party can extrapolate back along the supply chain to determine where the tampering occurred. The data can be retrieved via a reader at distance, as by radio frequency (RF) or infrared (IR) transmission, or by direct contact. In this application of the device, three tampering events can be detected and the tampering must occur by the opening of the package's closing tabs. An advantage of the analog methodology is that the number of "steps" or sensor circuits that can be monitored is limited only by the ability of the CPU to detect a change (signal) from any noise (variability in electrical characteristics of the circuit not due to tampering events). As shown in FIG. 4, the magnitude of the changes occasioned by the opening of the tab circuits can be increased by using low resistance pats for the parallel circuit and higher resistance traces for the traces comprising the resistances in parallel.

With reference to FIG. 4 the circuit 24 includes a pair of low resistance traces 28 connected to two pins of the CPU 26, and three pairs 30, 30; 32, 32; and 34, 34 of high resistance traces connecting the low resistance traces to the electrically conductive adhesive 12 of the closure tabs. Thus one each of the pairs of high resistance traces connects one of the low resistance traces to one each of each pair of closure tabs A—A; B—B; and C—C; the other of each pair of high resistance traces connects the other of the low resistance traces to the other of each pair of closure tabs.

Figure 5:
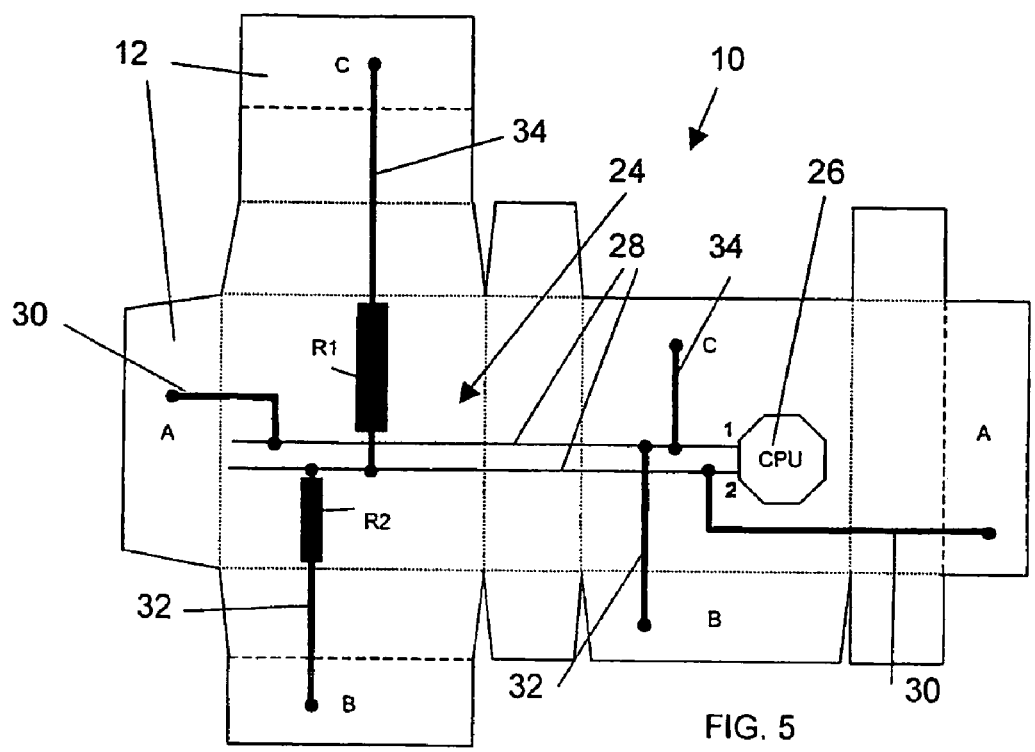
FIG. 5 depicts an analog package opening detection system with the ability to localize the point(s) of opening.

In the analog method previously described, the CPU cannot determine which tab has been opened as the reliably detectable changes may not be discriminable. To facilitate discriminability, the resistance of the conductive traces connecting each tab pair (A—A, B—B, C—C) to the parallel circuit can be given significantly different resistances. As shown in FIG. 5, the resistance (R1) of the printed trace associated with tabs C—C is less than that associated with tabs B—B (R2) in that the cross sectional area of path R1 (C—C) is greater. Both resistances R1 and R2 are greater than the resistance of the traces 30, 30 associated with the tabs A—A. The magnitude of changes associated with continuity breaking in one tab circuit compared to another can be programmed into the procedure memory of the CPU. Changes meeting a given criterion will represent disruption of a specific tab pair. In this way, both the tab location opened and the time of opening can be determined in the manner described above.

Figure 6:
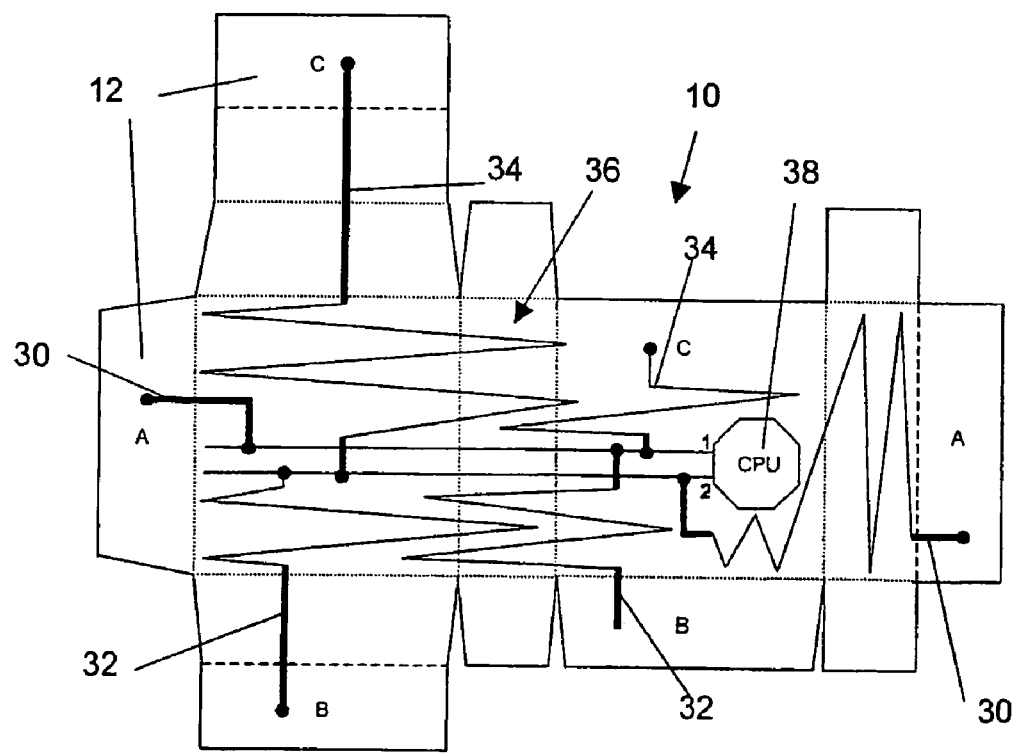
FIG. 6 depicts an analog opening and penetration detection system with three sensor circuits arranged as resistances in parallel.

The analog method can also be used to detect opening and penetration of a cardboard package. As illustrated in FIG. 6, the printed traces connecting the tab pairs can be arranged in a circuitous path 36 covering a large extent of the surface of the blank. The pairs of closing tabs (A—A, B—B, C—C) are arranged as resistances in parallel in a single electrically conducting circuit terminating on the input pins (1, 2) of a CPU 38. The ADC and CPU monitor the electrical characteristics of the circuit (resistance, voltage, current or combinations thereof) for fixed (or dynamic) change criteria stored (or calculated) in the CPU's procedure memory. When a change meets the criteria it is interpreted as an opening or penetration event, the time is determined from the CPU's clock, and the information is stored in the CPU's data memory. The data can later be retrieved by a party interested in whether or not the package was opened or penetrated (tampered). In FIG. 6, the sensor circuit traces are of higher resistance to maximize the discriminability of changes in the electrical characteristics occasioned by tampering events. This analog method may also incorporate the method described previously in which each sensor circuit has a different associated resistance to allow identification of the location of the tampering.

Figure 7:
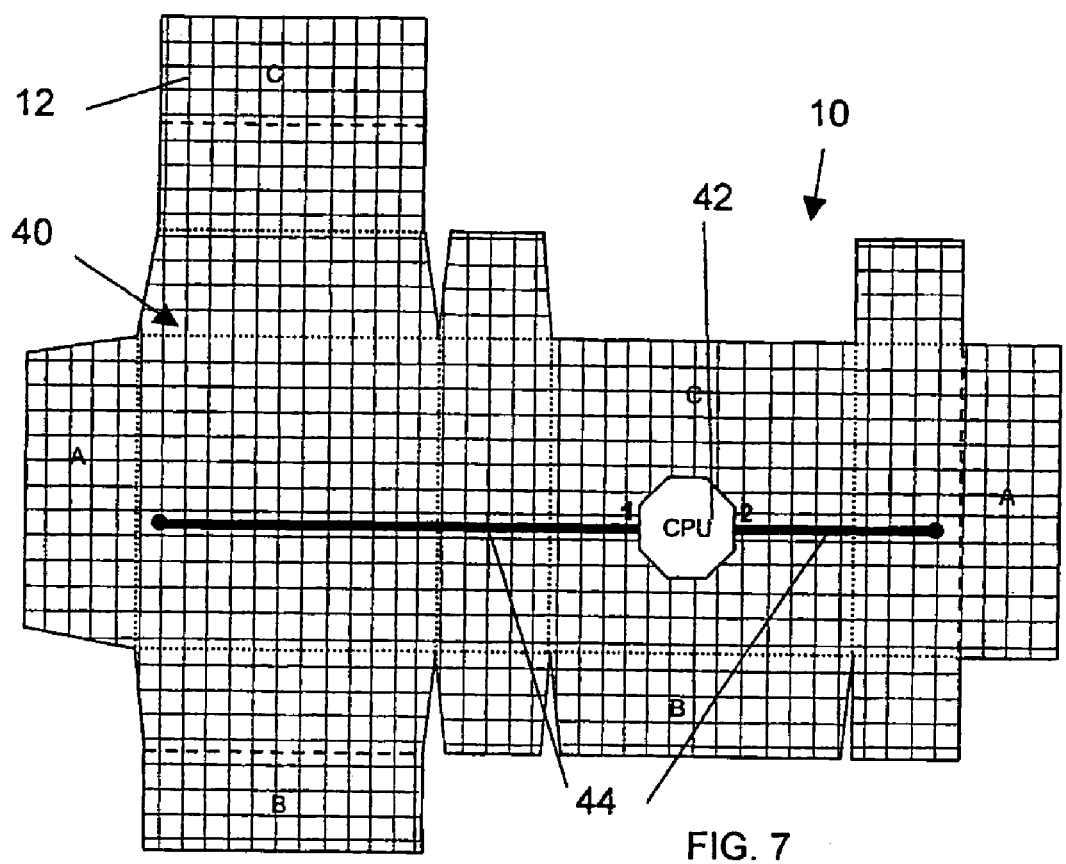
FIG. 7 depicts a package with a continuous grid of conductive traces monitored by an ADC and CPU to detect and localize multiple opening or penetration events (analog method)

In a further variation of the analog method, a continuous grid 40 of conductive traces is printed or otherwise applied to the entire surface of the blank (FIG. 7). The input terminals (1,2) of the CPU 42 are then connected to two disparate points on the grid via traces 44, 44 to form an electrically conducting circuit. Details of this attachment are given in FIG. 8. The CPU via its ADC monitors the electrical characteristics of the grid for changes of a magnitude that meets fixed (or dynamic) change criteria stored (or calculated) in the CPU's procedure memory. Opening of a tab or penetration of the grid changes its resistance. When changes meeting the criteria are detected they are interpreted as tampering events (opening or penetration). This method has the ability to detect a number of such events, but cannot identify their locations. The data are then stored in the CPU's data memory for subsequent downloading and interpretation as has been described previously.

In a further variation of the analog grid method described above, a continuous coating of electrically conducting ink or other material is printed or applied to the entire surface of the package. The input terminals of the CPU are then connected to two disparate points on the surface to form an electrically conducting circuit. The CPU via its ADC monitors the electrical characteristics of the surface (circuit) for changes that meet fixed (or dynamic) change criteria stored (or calculated) in the CPU's procedure memory. Opening of a tab or penetration of the surface changes its resistance. When changes meeting the criteria are detected they are interpreted as tampering events (opening or penetration). This method has the ability to detect a number of such events, but cannot identify their locations. The data are then stored in the CPU's data memory for subsequent downloading and interpretation as has been described previously.

Figure 8:
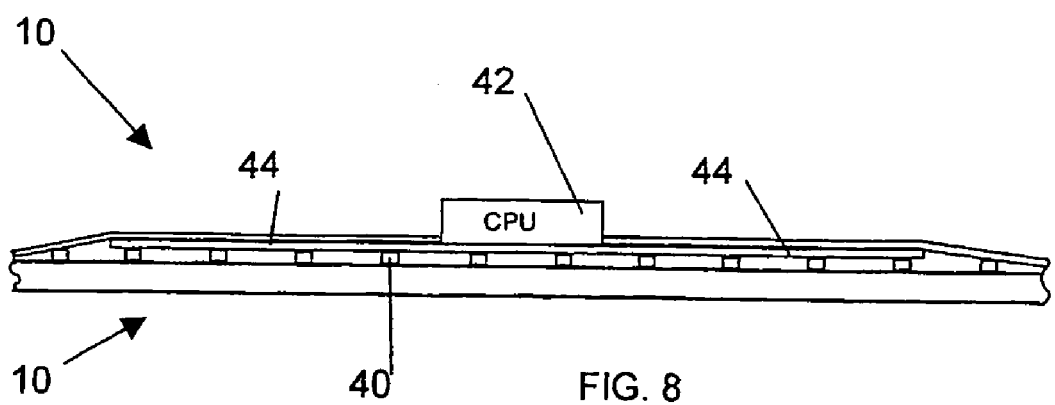
FIG. 8 is a schematic drawing of the cross-section of a package with a continuous grid monitored by a CPU and its ADC (analog method)
Figure 9:
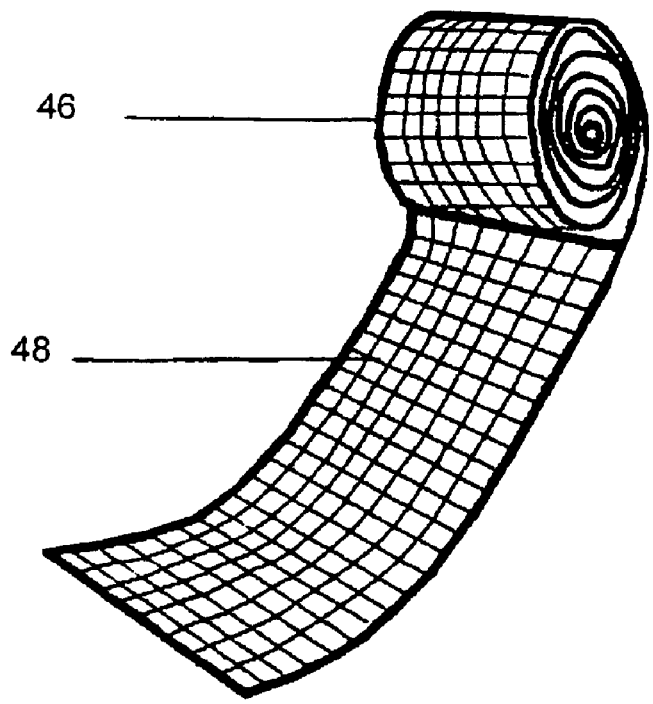
FIG. 9 shows cardboard roll stock with a continuous electrically conducting grid applied to its surface.

To facilitate the manufacturing of tamper-sensing cardboard containers, a cardboard roll stock 46 can be covered with a continuous grid 48 of electrically conducting traces either by printing or other means of application (FIG. 9) at the time of its production. When individual packages are later die or otherwise cut from the roll stock, they will have a continuous grid applied to their surface. A CPU can then be attached to the grid by two input pins as shown in FIGS. 7 and 8. The electrical characteristics of the grid circuit can then be monitored for changes by the CPU via its ADC. When changes meeting the fixed (or dynamic) change criteria stored (or calculated) in the CPU's procedure memory are detected, the time is determined from the CPU's clock and recorded in the data memory. The data can later be retrieved and interpreted as described previously.

Figure 10:
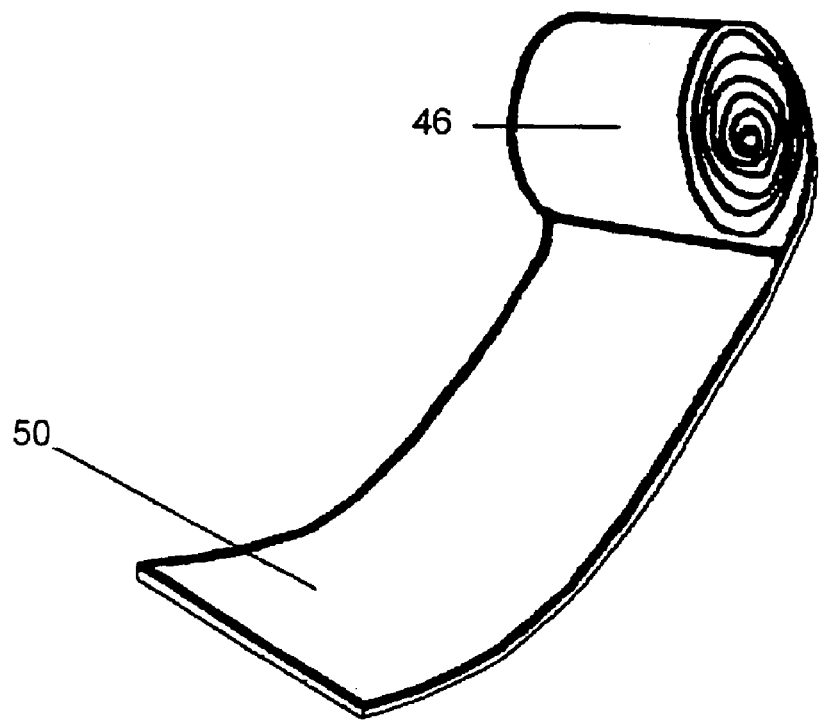
FIG. 10 shows cardboard roll stock with a continuous electrically conducting coating.

Similarly, a continuous electrically conducting coating 50 can be applied to the cardboard roll stock 46 for subsequent incorporation into tamper-detecting packages as described for the continuous grid above (FIG. 10).

The application of tamper-sensing traces is not limited to the interior surface of a package but can equally be applied to the exterior or laminated between the layers of a multi-layered cardboard package.

The shape of the package is not limited to square or rectangular designs and includes any shaped package manufactured by folding and gluing or otherwise being sealed.

The invention is not limited to cardboard packages but can be used with all materials from which folded packages can be constructed including, but not limited to, plastics and other laminated materials.

The CPU can be located either on the interior or exterior of the package and can be embedded in the cardboard where appropriate.

The CPU may in addition monitor other environmental characteristics capable of giving information about tampering with a package such as, but not limited to, shock, temperature, radiation, humidity and pressure and light.

The CPU may also be programmed to generate warning signals to indicate when tampering has been detected. The warning device may be any device which can present a warning, such as light-emitting diodes (LED's), liquid crystal displays (LCD's) or other types of displays, audible devices, or any combination thereof. The warning device may also transmit the warning covertly and at distance such as by RF or other means.

The invention claimed is:

1. A system for detecting tampering or unauthorized entry into a package formed from a blank having at least a pair of closure tabs, an inner surface and an outer surface, said system comprising:
   electrically conducting adhesive applied to each of said closure tabs;
   a programmable chip applied to one of said blank surfaces, said chip including a power source, procedure memory, data memory, clock means, and communication means; and
   electrically conducting trace means applied to one of said blank surfaces, one such trace means connecting said chip to the electrically conducting adhesive of one of said pair of closure tabs, and another of such trace means connecting said chip to the electrically conductive adhesive of the other of said pair of closure tabs;
   whereby with said blank having been formed into a closed package through adhesive joining together of said closure tabs, any separation of said tabs will break an electrical circuit which includes said trace means, said electrically conducting adhesive, and said chip means, which break will be recorded with a time stamp in said data memory of said chip.

2. The system of claim 1 wherein said blank includes three pairs of closure tabs, each being coated with electrically conductive adhesive, and wherein said trace means includes first trace means connecting said chip to each closure tab of a first pair of closure tabs, second trace means connecting each closure tab of said first pair of closure tabs to a respective closure tab of a second pair of closure tabs, and third trace means connecting each closure tab of said first pair of closure tabs to a respective closure tab of the third pair of closure tabs.

3. The system of claim 1 wherein said blank includes three pairs of closure tabs, each being coated with electrically conductive adhesive, and wherein said trace means includes first trace means connecting said chip to each closure tab of a first pair of closure tabs, second trace means connecting said chip to one closure tab of each of said second and third pairs of closure tabs, and third trace means connecting the other of each of said second and third pairs of closure tabs to said first trace means.

4. The system of claim 1 wherein said trace means are applied to said blank along a path which defines the shortest practical distance between connection points at each end thereof.

5. The system of claim 1 wherein said trace means are applied to said blank along a circuitous path that covers a substantial extent of said blank.

6. The system of claim 1 wherein said procedure memory and/or said data memory is either volatile or non-volatile and is either internal or external to said chip.

7. The system of claim 1 wherein said communication means includes means for communicating data from said data memory with an external receiver via radio frequency (RF), infrared (IR), or via a direct physical connection.

8. The system of claim 1 wherein said trace means are printed onto said blank as an electrically conductive ink.

9. The system of claim 1 wherein said trace means are screen printed onto said blank.

10. The system of claim 1 wherein said trace means are thin conductive wires adhered to said blank.

11. The system of claim 1 wherein said chip includes an analog to digital converter (ADC); and said trace means comprises at least two low resistance electrically conducting trace means applied to one of said blank surfaces and connected at one end thereof to said chip, and at least two high resistance electrically conductive trace means applied to said one blank surface, one of such high resistance trace means connecting one of said low resistance trace means to the electrically conducting adhesive of one of said pair of closure tabs, and another of such high resistance trace means connecting the other of said low resistance trace means to the electrically conductive adhesive of the other of said pair of closure tabs.

12. The system of claim 11 wherein said blank includes three pairs of closure tabs, each being coated with electrically conductive adhesive, and wherein said high resistance trace means includes first high resistance trace means connecting said low resistance trace means to respective ones of a first pair of closure tabs, second trace means connecting said low resistance trace means to respective ones of a second pair of closure tabs, and third trace means connecting said low resistance trace means to respective ones of the third pair of closure tabs.

13. The system of claim 11 wherein the resistance of each of said high resistance trace means differs significantly from the resistance of the others of said high resistance trace means.

14. The system of claim 11 wherein said high resistance trace means are applied to said blank along paths which define the shortest practical distance between connection points at each end thereof.

15. The system of claim 11 wherein said high resistance trace means are applied to said blank along circuitous paths that cover a substantial extent of said blank.

16. The system of claim 1 wherein said blank is formed from a plurality of layers sandwiched together and said trace means are applied between one pair of such layers.

17. The system of claim 1 including means connected to said chip for sensing one or more conditions related to temperature, humidity, vibration, orientation, pressure, radiation and light and for recording in said data memory changes in such conditions beyond predetermined thresholds relating thereto.

18. A system for detecting tampering or unauthorized entry into a package formed from a blank having at least a pair of closure tabs, an inner surface and an outer surface, said system comprising:

electrically conducting adhesive applied to each of said closure tabs;

a programmable chip applied to one of said surfaces, said chip including a power source, procedure memory, data memory, clock means, an analog to digital converter (ADC), and communication means; and a grid of low resistance electrically conducting trace means applied to one surface of the blank, and high resistance electrically conductive trace means connecting said chip to said grid at two separate points thereon;

whereby with said blank having been formed into a closed package through adhesive joining together of said closure tabs, any separation of said tabs or penetration of said package will break an electrical circuit which includes said trace means, said electrically conducting adhesive, and said chip means, which break will be recorded as a change in system resistance with a time stamp in said data memory of said chip.

19. The system of claim 18 wherein said blank is formed from a continuous roll of blank material to which said grid of low resistance electrically conducting trace means has been applied prior to formation of said blank.

20. The system of claim 18 wherein said blank is formed from a plurality of layers sandwiched together and at least said grid is located between one pair of such layers.

21. A system for detecting tampering or unauthorized entry into a package formed from a blank having at least a pair of closure tabs, an inner surface and an outer surface, said system comprising:

electrically conducting adhesive applied to each of said closure tabs;

a programmable chip applied to one of said surfaces, said chip including a power source, procedure memory, data memory, clock means, an analog to digital converter (ADC), and communication means;

a coating of low resistance electrically conducting trace means applied to one surface of the blank to cover such surface;

and high resistance electrically conductive trace means connecting said chip to said coating at two separate points thereon;

whereby with said blank having been formed into a closed package through adhesive joining together of said closure tabs, any separation of said tabs or penetration of said package will alter an electrical circuit which includes said trace means, said coating, said electrically conducting adhesive, and said chip means, which separation or penetration will be recorded as a change in system resistance with a time stamp in said data memory of said chip.

22. The system of claim 21 wherein said blank is formed from a continuous roll of blank material to which said low resistance electrically conducting coating has been applied prior to formation of said blank.

23. The system of claim 21 wherein said blank is formed from a plurality of layers sandwiched together and said coating is applied to one of said layers such that it is located between one pair of such layers.

* * * * *